(12) United States Patent
Baker et al.

(10) Patent No.: US 6,668,542 B2
(45) Date of Patent: Dec. 30, 2003

(54) PULSE DETONATION BYPASS ENGINE PROPULSION POD

(75) Inventors: Von David Baker, Indianapolis, IN (US); Bernie Joseph Rezy, Danville, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 10/103,606

(22) Filed: Mar. 21, 2002

(65) Prior Publication Data

US 2002/0166318 A1 Nov. 14, 2002

Related U.S. Application Data

(63) Continuation-in-part of application No. 09/521,031, filed on Mar. 7, 2000, now abandoned.
(60) Provisional application No. 60/161,871, filed on Oct. 27, 1999.

(51) Int. Cl.[7] ............................................. F02K 7/075
(52) U.S. Cl. ........................................................ 60/247
(58) Field of Search ................... 60/247, 248, 39.76, 60/39.78, 230; 239/265.19

(56) References Cited

U.S. PATENT DOCUMENTS

| | | |
|---|---|---|
| 1,980,266 A | 11/1934 | Goodard |
| 2,523,308 A | 9/1950 | Kemmer et al. |
| 2,612,748 A | 10/1952 | Tenney et al. |
| 2,738,147 A | 3/1956 | Leech |
| 2,740,254 A | 4/1956 | Ballauer et al. |
| 2,750,733 A | 6/1956 | Paris et al. |
| 2,757,509 A | 8/1956 | Jendrassik |
| 3,332,236 A | 7/1967 | Kunsagi |
| 3,417,564 A | 12/1968 | Call |
| 3,702,632 A | 11/1972 | Grimshaw |
| 3,774,868 A | 11/1973 | Goetz |
| 3,848,408 A | 11/1974 | Tompkins |
| 4,098,076 A | 7/1978 | Young et al. |
| 4,121,066 A | 10/1978 | Horowitz |
| 4,241,576 A | 12/1980 | Gertz |
| 4,241,876 A | 12/1980 | Pedersen |
| 4,627,586 A | 12/1986 | Krumins et al. |
| 4,778,109 A | 10/1988 | Jourdien et al. |
| 4,878,617 A | 11/1989 | Novotny |
| 4,964,339 A | 10/1990 | Bastien et al. |
| 4,992,039 A | 2/1991 | Lockwood, Jr. |
| 5,081,835 A | 1/1992 | Ewing, Jr. |
| 5,082,181 A | 1/1992 | Brees et al. |
| 5,345,758 A | 9/1994 | Bussing |
| 5,353,588 A | 10/1994 | Richard |
| 5,513,489 A | 5/1996 | Bussing |
| 5,615,548 A | 4/1997 | Winfree et al. |
| 5,690,280 A | 11/1997 | Holowach et al. |
| 5,699,966 A | 12/1997 | Beverage |
| 5,806,791 A | 9/1998 | Hatalsky et al. |
| 5,873,240 A | 2/1999 | Bussing et al. |
| 5,916,125 A | 6/1999 | Snyder |
| 6,003,301 A | 12/1999 | Bratkovich et al. |
| 6,142,417 A | 11/2000 | Figge, Sr. |
| 6,293,091 B1 * | 9/2001 | Seymour et al. ............... 60/225 |
| 6,516,605 B1 * | 2/2003 | Meholic ....................... 60/247 |

OTHER PUBLICATIONS

Pulse Combustion and Wave Rotors For High–Speed Propulsion Engines, Nalim and Jules, Indianapolis, IN and Cleveland, OH, Apr. 27–30, 1998.

* cited by examiner

*Primary Examiner*—Ehud Gartenberg
(74) *Attorney, Agent, or Firm*—Woodard, Emhardt, Moriarty, McNett & Henry LLP

(57) ABSTRACT

A propulsion pod for a twin tube, rotary inlet valve, pulse detonation engine includes a shared, two-dimensional, low aspect ratio wedge nozzle in which each side of the wedge is transitioned into the discharge end of the detonation tubes of the engine. The nozzle design results in a quasi-separate exhaust flow path with two separate nozzle throat areas, one for each detonation tube. Actuation of the center wedge of the nozzle provides pitch vectoring of the exhaust. Actuation of flaps integrated into the side walls of the nozzle provides yaw vectoring. The detonation tubes are cooled by flowing bypass air over cooling means coupled to the detonation tubes.

18 Claims, 3 Drawing Sheets

PULSE DETONATION BYPASS ENGINE PROPULSION POD

The present application is a continuation-in-part of U.S. patent application Ser. No. 09/521,031 filed Mar. 7, 2000, now abandoned. The application Ser. No. 09/521,031 claims the benefit of U.S. Provisional Patent Application Serial No. 60/161,871 filed Oct. 27, 1999. Each of the above United States Patent Applications are incorporated herein by reference.

BACKGROUND OF THE INVENTION

The present invention relates generally to the field of pulse detonation engines. More particularly, the present invention relates to a twin-tube, rotary inlet valve, pulse detonation engine propulsion pod having a shared, two-dimensional wedge nozzle with thrust vectoring capability.

A pulse detonation engine utilizes a series of repetitive detonations within a detonation chamber to produce a high pressure exhaust. The detonation of gaseous fuel in the detonation chamber causes a pulse detonation wave to propagate at supersonic speeds. The detonation wave compresses the fluid in the detonation chamber, thereby increasing its pressure, density, and temperature. As the detonation wave passes out of the open, downstream end of the chamber, the supersonic flow expands to ambient pressure, and the pulse detonation engine experiences thrust.

A pulse detonation engine is distinct from a pulse jet engine which utilizes a deflagration combustion process. Deflagration waves are subsonic in contrast to the supersonic speeds of detonation waves.

A pulse detonation engine could be employed to power missiles, rockets, or other subsonic and supersonic vehicles. The vectoring of these flight vehicles in the pitch and yaw directions generally requires the use of external control surfaces; however, these types of control surfaces add weight to the vehicle and provide relatively slow response. Thus, for such applications, it is advantageous to integrate the pulse detonation engine into an aerodynamically efficient, thrust-vectored propulsion pod. The present invention satisfies this need in a novel and unobvious way.

SUMMARY OF THE INVENTION

One aspect of the invention described herein is the integration of a twin-tube, rotary inlet valve, pulse detonation engine into an aerodynamically efficient propulsion pod. The present invention further provides a simple, low-cost combustion case cooling system that includes flowing a portion of the inlet air into an outer annular bypass channel that contains means for cooling the detonation tubes. The cooling means may be a plurality of thin radial cooling fins, honeycomb passages, or pin fins that act as a heat sink for cooling the outer cases of the detonation tubes.

Another aspect of the invention is the integration of the exhaust nozzle with the detonation tubes. One embodiment of the present invention includes a shared, two-dimensional, low aspect ratio wedge nozzle in which each side of the wedge is transitioned into the discharge end of the detonation tubes. The nozzle design results in a quasi-separate exhaust flow path with two separate nozzle throat areas, one for each detonation tube. Pitch vectoring of the exhaust can is provided by mechanically actuating a center wedge member. In another embodiment, a pair of triangular hinged flaps are integrated into the side walls of the nozzle to provide a degree of yaw vectoring.

One object of the present invention is to provide a unique pulse detonation bypass engine propulsion pod.

Related objects and advantages of the present invention will be apparent from the following description.

DESCRIPTION OF THE PREFERRED EMBODIMENTS

Figure 2:
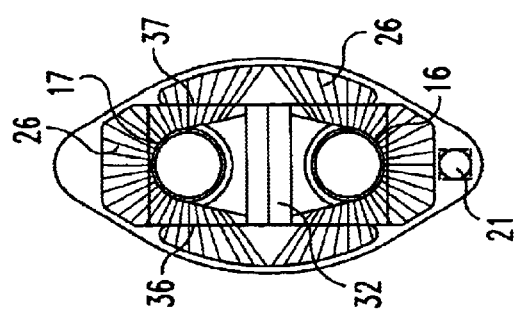
FIG. 2 is an end view of the right end of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

The present invention incorporates existing, demonstrated pulse detonation engine technology into a propulsion pod to produce an efficiently integrated flowpath in order to maximize installed thrust-minus-drag and to minimize weight and cost. In one embodiment, the present invention could be used for extended subsonic cruise missiles or Unmanned Aerial Vehicles; however, the present invention is not limited to any given air vehicle application or to subsonic air vehicles only. A person of ordinary skill in the art would readily be able to convert the subsonic propulsion pod illustrated into a supersonic air vehicle application by using a suitable supersonic air inlet and by modification of the exhaust nozzle to account for the potentially higher nozzle area ratio associated with supersonic flight.

Figure 1:
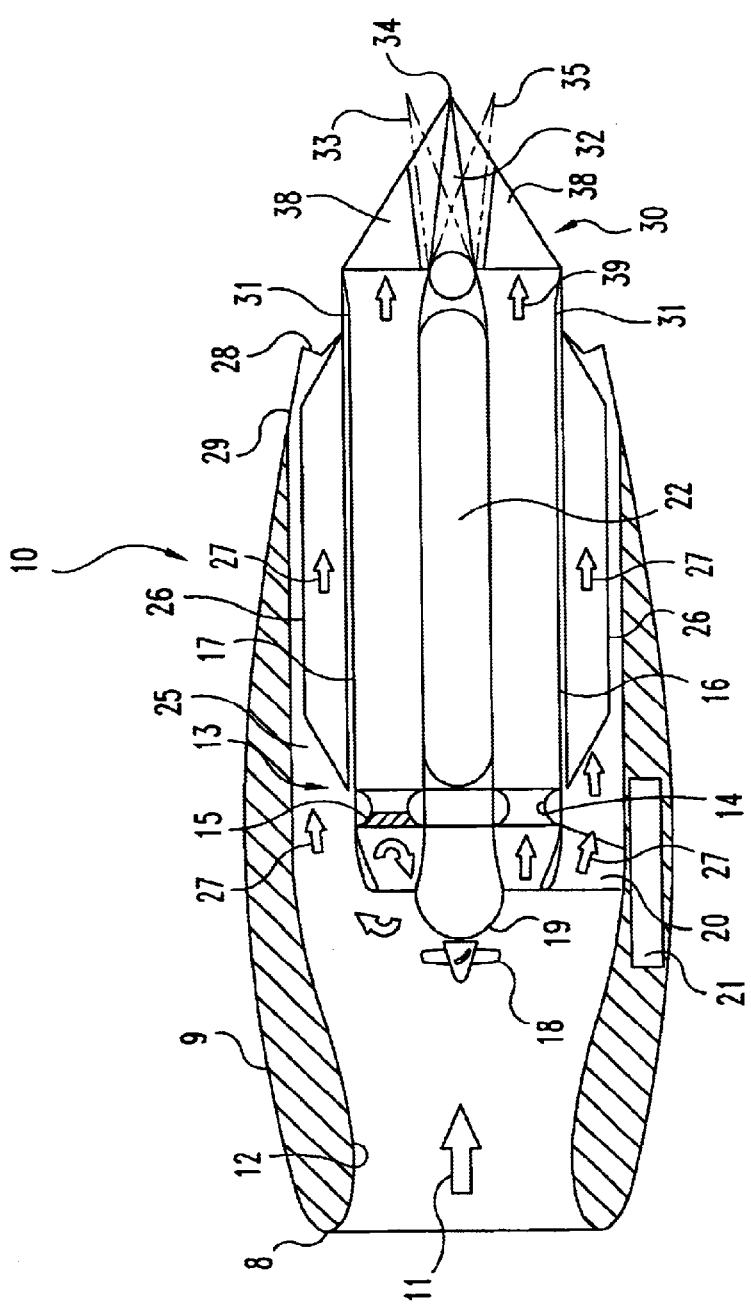
FIG. 1 is a longitudinal cross-sectional view of a pulse detonation bypass engine propulsion pod according to one embodiment of the present invention.

With reference to FIGS. 1 and 2, pulse detonation bypass engine propulsion pod 10 is illustrated. Inlet ram air 11 enters housing 9 of pod 10 through a conventional subsonic pitot inlet 8 and flows aft through diffusing section 12. A portion of inlet air 11 flows into detonator tube 16 of pulse detonation engine 13 through open rotary valve passage 14. Inlet air 11 is blocked from entering detonation tube 17 by closed rotary valve passage 15. As illustrated in FIG. 1, detonator tube 16 is in the filling (i.e., purge/fresh air/fuel injection) phase of the pulse detonation cycle. While air is flowing into detonation tube 16 through open valve passage 14, detonation tube 17 is firing with a higher than atmospheric internal pressure pulse that results in a nozzle throat velocity that is at or near sonic velocity (i.e., choked) at the discharge end 31 of tube 17. Pulse detonation engine 13 has a longitudinal axis along which tubes 16 and 17 may, but need not necessarily, be aligned.

Another portion of inlet air 11 becomes bypass air 27 and flows into outer bypass channel 25 which, in the preferred embodiment, is annular in shape. Because detonation tubes 16 and 17 experience high combustion temperatures, means 26 for cooling detonation tubes 16 and 17 is disposed within bypass channel 25 and thermally coupled to detonation tubes 16 and 17. Bypass air 27 flows over cooling means 26, and the temperature of bypass air 27 increases as a result of the heat rejection from cooling means 26. Bypass air 27 continues to flow aft through bypass convergent nozzle 28 which is surrounded by outer boattail fairing 29 having a sufficiently low closure angle to minimize external drag. In one embodiment, the effectiveness of the bypass cooling system of the present invention is a function of the temperature of inlet ram air 11.

Cooling means 26 may be a plurality of thin radial cooling fins as illustrated in FIG. 1, or, alternatively, a plurality of axially-aligned honeycomb passages, or pin-fins. Cooling means 26 is preferably made from material having high thermal conductivity in order to efficiently transfer heat from detonation tubes 16 and 17 into bypass air 27. If the heat rejection rate from detonation tubes 16 and 17 is sufficient to justify a heat pump design, cooling means 26 can include hollow pipes filled, with a high heat vaporization material, such as sodium or a mixture of sodium and potassium. The resulting closed-loop evaporator-condenser configuration would transfer heat from detonation tubes 16 and 17 into bypass air 27. Static operation of pulse detonation bypass engine propulsion pod 10 deprives it of inlet ram air 11; thus, cooling of detonation tubes 16 and 17 is accomplished by radiation cooling from cooling means 26 or, for extended static operation, by an augmented cooling system. One example of an augmented cooling system includes a fan.

Pulse detonation engine 13 includes a detonation tube igniter system, air intake system controlled by a rotary valve, and a fuel injection system. Twin tube pulse detonation engine 13 operates with alternating filling and firing sequences that are 180 degrees out of phase and at a sufficient frequency to approach quasi-steady exhaust flow conditions. During cruise, the operation of the rotary valve is powered by compact ram air turbine generator/electric motor 18 which powers synchronizing geared drive 19 to mechanically actuate the rotary valve operation. From air turbine motor 18, a right angle quill shaft drive passes through airfoil-shaped strut 20 and operates fuel injection pump and control valve 21 located in the nacelle cavity. Also housed in the nacelle cavity are the main fuel lines and other electrical lines that communicate with engine 13 across bypass channel 25 via a service pylon. Pressurized tank 22 contains a suitable pre-detonator fuel, such as gaseous hydrogen, and is used during the initial starting sequence to reduce transition time from deflagration to detonation, thereby enhancing the thrust producing performance of the pulse detonation combustion process. The triggering and injection of the pre-detonator fuel into detonation tubes 16 and 17 can be accomplished by one of several methods using known art.

Typically, the exhaust pressure ratio of a detonation tube is significantly greater than that required to choke the flow; hence, proper exhaustion of the flow from pulse detonation engine 13 requires a suitable divergent extension or nozzle 30 that is in flow communication with discharge end 31 of detonation tubes 16 and 17. Nozzle 30 could be either axisymmetric (i.e., aligned with the longitudinal axis of engine 13) or two dimensional in shape. The purposes of nozzle 30 are to recover additional thrust from the expansion of the supersonic flow to ambient pressure, as well as to facilitate a low external drag installation.

In a preferred embodiment, nozzle 30 is a two-dimensional, low aspect ratio wedge nozzle that is shared between detonation tubes 16 and 17. Each side of wedge nozzle 30 is transitioned into discharge end 31 of detonation tubes 16 and 17 using known transition duct art. Nozzle 30 advantageously integrates efficiently not only with aft boattail fairing 29 of propulsion pod 10 to avoid an inner base area, but also with exhaust flowpath 39 from each of detonation tubes 16 and 17 to preclude the need for two axisymmetric separate exhaust nozzles with potentially lower installed thrust-minus-drag performance.

Further, nozzle 30 includes means, such as center wedge fairing 32, for maintaining separate exhaust flowpath 39 from each detonation tube. Such means inhibits the high pressure pulsed exhaust flow from the firing detonation tube from flowing into the adjacent detonation tube during its low pressure filling phase. To this end, shared two-dimensional wedge nozzle 30 provides quasi-separate exhaust paths to ambient pressure for detonation tubes 16 and 17. Center wedge fairing 32 of nozzle 30 also defines two separate nozzle throat areas-one for each of tubes 16 and 17. Consequently, during non-rammed, static operation, the higher pulsating pressure exhaust flow at the nozzle throat of the firing tube is discouraged from flowing back into the adjacent tube during the low pressure filling phase. Such back-flowing of exhaust 39 is often encountered in designs where both detonation tubes discharge exhaust through a common nozzle throat area, such as would typically be embodied in a single, axisymmetric, convergent-divergent nozzle.

In one embodiment, center wedge fairing 32 of wedge nozzle 30 is movable in order to permit pitch vectoring of exhaust 39. Pitch vectoring is accomplished by mechanically actuating fairing 32 from the non-vectored cruise position 34 to pitch up (i.e., nose up) vector position 33 or to pitch down (i.e., nose down) vector position 35. Although illustrated in FIG. 1 as approximately 15 degrees, the amount of rotation of center wedge fairing 32 may be greater than or less than 15 degrees depending upon the desired amount of pitch control. Yaw vectoring is accomplished by actuation of hinged triangular flaps 38 in side walls 36 and 37 of nozzle 30. The degree of rotation of flaps 38 again depends upon the desired amount of yaw control.

Pitch and yaw vectoring of nozzle exhaust 39 can enhance the aerodynamic control of the vehicle. The specific vectoring applied to the vehicle depends upon the stability and control parameters of the vehicle. Actuation of wedge nozzle 30 to the pitch and yaw vectoring positions can be mechanically achieved using various actuation designs from the known art. In another embodiment, thrust vectoring is omitted, and nozzle 30 has a fixed geometry. Such fixed geometry design is satisfactory so long as the intended nozzle pressure ratio range is compatible with the nozzle area ratio selection in order to preclude potentially significant off-design losses in thrust coefficient. Such losses would be due primarily to over-expansion losses that would be incurred during the low speed portion of the mission when the nozzle pressure ratio is significantly below the design value. Such off-design performance can generally be improved by using an external expansion plug or two-dimensional wedge nozzle, such as nozzle 30.

Pulse detonation bypass engine propulsion pod 10 can be integrated with an air vehicle system by using a pylon attachment either to the main body of the missile, or to the aircraft wings if a multi-pod installation is intended. JP-10 or other appropriate liquid fuel is supplied from the air vehicle through the pylon attachment to fuel injection pump and control valve 21 of pod 10. The electrical power used by pod 10 is generated by ram air turbine motor 18 during acceleration and cruise, and by auxiliary battery power during ground start and low speed acceleration. A boosted launch or air-dropped launch could rely only on power extracted from ram air turbine motor 18.

Figure 3:
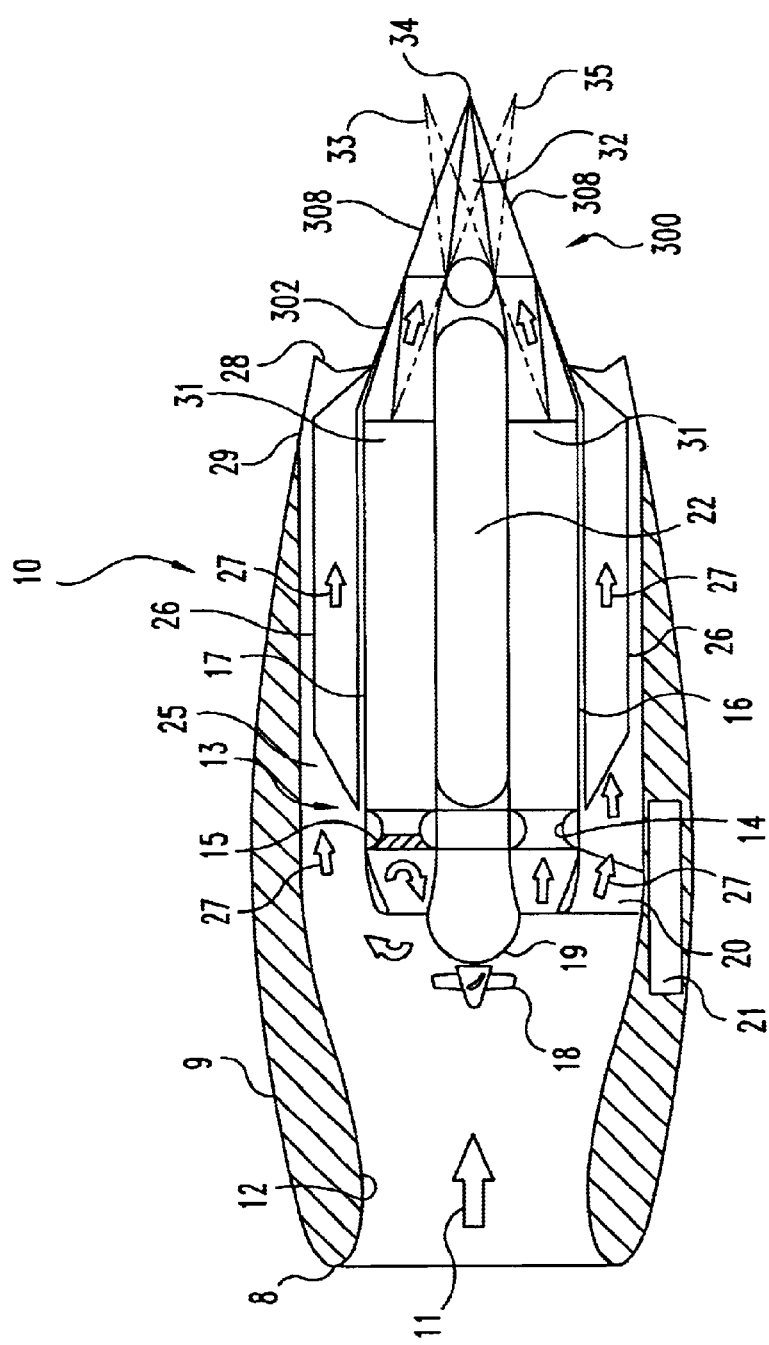
FIG. 3 is a longitudinal cross-sectional view of a pulse detonation bypass engine propulsion pod according to another embodiment of the present invention.
Figure 4:
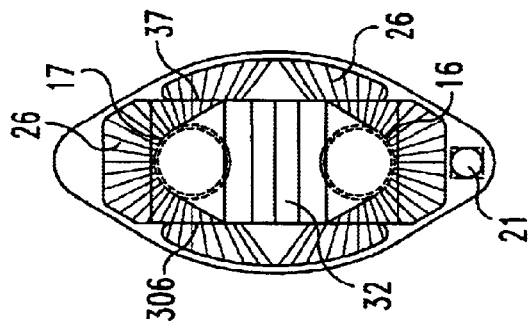
FIG. 4 is an end view of the right end of FIG. 3.

With reference to FIGS. 3 and 4, there is illustrated another embodiment of the pulse detonation bypass engine propulsion pod 100. The pulse detonation engine propulsion pod 100 is substantially similar to the pulse detonation engine propulsion pod 10. The utilization of identical features numbers will be used to identify substantially identical features. In the embodiment set forth in FIGS. 3 and 4, the discharge end 31 of detonation tubes 16 and 17 is converged to the throat plane 301 of nozzle 300 by a transition section 302. The transition section 302 converts the tubular flowpath from circular to two-dimensional at the nozzle throat. The two-dimensional width of the nozzle throat is bounded by sidewalls 306, which continue downstream of the throat by converging sidewalls 308. The two-dimensional throat converges the exhaust without the formation of base area between the upper and lower exhaust flowpaths, which would result in a base drag formation.

Figure 5:
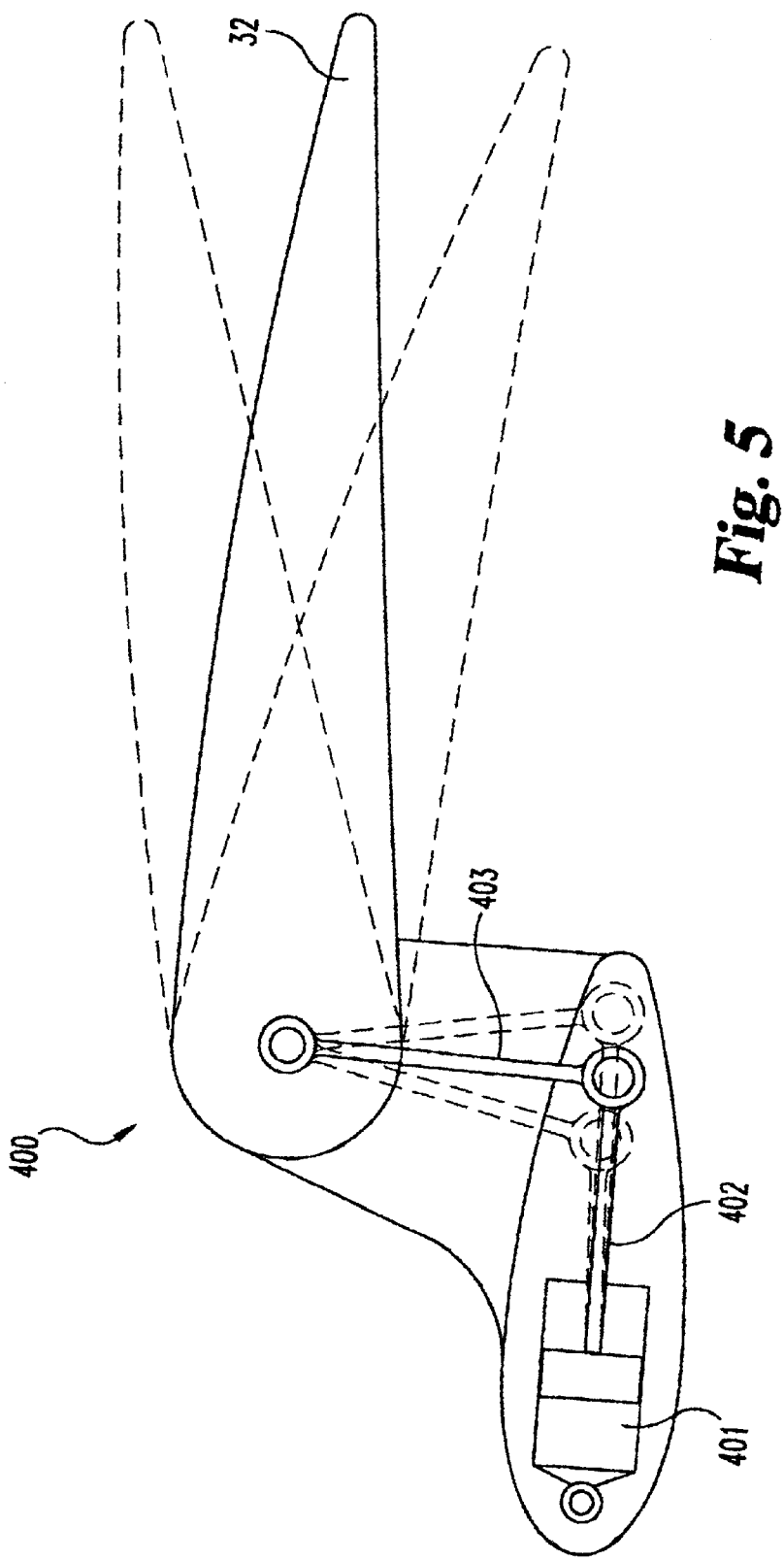
FIG. 5 is an illustrative view of one embodiment of an actuation system for moving a center wedge fairing of the present invention.

With reference to FIG. 5, there is illustrated one embodiment of an actuator/linkage system 400 for the center wedge fairing 32. The actuator/linkage system 400 includes a mechanical actuator 401 which is coupled to a first mechanical member 402. The first mechanical member 402 is coupled to a second mechanical member 403. In operation the mechanical actuator is operated to move the first mechanical member 402 which moves the second mechanical member 403 and causes rotation of the center wedge fairing 32. In one form of the present invention the mechanical actuator 401 comprises either a hydraulic actuator or a electrically driven jack-screw. Corresponding to the selection of the mechanical actuator the first mechanical member 402 will be either a pushrod or a jackscrew. The crank arm 403 has a first end coupled to the center wedge fairing and a second end coupled to the pushrod or jackscrew. The actuator/linkage system can include one actuator on each side of the propulsion pod or one center mounted actuator. The present invention contemplates alternative actuator/linkage systems for controlling the movement of the center wedge fairing.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus comprising:
    a housing having an inlet adapted for receiving ram air;
    a pulse detonation engine disposed within said housing, said engine including two detonation tubes, each of said tubes having a discharge end; and
    a nozzle in flow communication with said discharge ends of said detonation tubes, said nozzle having an outlet with a center portion, wherein a center wedge fairing extending across said center portion.

2. The apparatus of claim 1, wherein said engine includes a longitudinal axis, and wherein said center wedge fairing is symmetric about said longitudinal axis.

3. The apparatus of claim 1, wherein said center wedge fairing in fixed.

4. The apparatus of claim 1, wherein said engine includes a longitudinal axis, and wherein said center wedge fairing is rotatable from a non-vectored position substantially aligned with said longitudinal axis of said engine to a vectored position to produce pitch-vectoring of said apparatus.

5. The apparatus of claim 4, wherein said nozzle further includes an actuator operatively connected to said center wedge fairing, said actuator selectively controlling the position of said fairing.

6. The apparatus of claim 1, wherein said nozzle further includes a side wall having a flap hingeably mounted thereto, the rotation of said flap producing yaw-vectoring of said apparatus.

7. The apparatus of claim 1, wherein said housing and said pulse detonation engine define a bypass channel therebetween, a portion of said ram air flowing in said bypass channel; and wherein said apparatus further comprises:
    cooling means for cooling said detonation tubes, said cooling means disposed in said bypass channel and thermally coupled to said detonation tubes.

8. The apparatus of claim 7, wherein said cooling means includes a plurality of hollow pipes filled with a high heat vaporization material.

9. An apparatus comprising:
    a housing;
    a pulse detonation engine having two detonation tubes disposed within said housing, each of said tubes having an end through which exhaust is discharged; and
    a nozzle in flow communication with said discharge ends of said detonation tubes, said nozzle having means for maintaining separate said exhaust front each of said detonation tubes.

10. An apparatus comprising:
    a housing;
    a pulse detonation engine disposed within said housing, said engine having a longitudinal axis and a first and a second detonation tube, each of said tubes having a firing and a filling phase and having an end through which exhaust is discharged; and
    a nozzle having two throats, one throat in flow communication with said discharge end of said first tube and the other throat in flow communication with said discharge end of said second tube, said nozzle further including means for inhibiting exhaust from said first tube during its firing phase from flowing into said second tube during its filling phase.

11. The apparatus of claim 1, wherein said center wedge fairing maintains a separate exhaust flow path from each of said detonation tubes.

12. The apparatus of claim 1, wherein said discharge end of each of said detonation tubes extends beyond said housing.

13. The apparatus of claim 1, wherein said center wedge fairing maintains a separate exhaust flow path from each of said detonation tubes, and further wherein said discharge end of each of said detonation tubes extends beyond said housing.

14. The apparatus of claim 1, wherein said nozzle includes a pair of opposed side wall members, and which further includes a flap hingeably mounted to each of said pair of side wall members, and wherein the rotation of said flap producing yaw vectoring of the apparatus.

15. The apparatus of claim 7, wherein said cooling means includes a plurality of cooling members.

16. The apparatus of claim 1, wherein one of said detonation tubes is filled while the other is fired, and wherein said detonation tubes are filled at a frequency sufficient to facilitate quasi-steady exhaust flow.

17. The apparatus of claim 1, which further includes a rotary valve to control the passage of fluid into the detonation tubes, and which further includes a pressurized-tank for supplying pre-detonator fuel to said pulse detonation engine during a starting period.

18. The apparatus of claim 1, where said nozzle is a two-dimensional low aspect ratio wedge nozzle.

* * * * *